United States Patent [19]

Dixon

[11] 3,757,233

[45] Sept. 4, 1973

[54] DIGITAL FILTER

[75] Inventor: Harold G. Dixon, Charlottesville, Va.

[73] Assignee: Sperry Rand Corporation, New York, N.Y.

[22] Filed: Feb. 4, 1972

[21] Appl. No.: 223,554

[52] U.S. Cl. .................... 328/138, 328/141, 328/48
[51] Int. Cl. .................... H03k 9/06
[58] Field of Search .................... 328/138, 141, 48

[56] References Cited

UNITED STATES PATENTS

| | | | |
|---|---|---|---|
| 3,521,176 | 7/1970 | Box et al. | 328/141 |
| 3,549,997 | 12/1970 | Rotzel | 328/141 X |
| 3,555,438 | 1/1971 | Ragsdales | 328/138 X |
| 3,696,303 | 10/1972 | Hartig | 328/141 X |

*Primary Examiner*—John S. Heyman
*Attorney*—Howard P. Terry

[57] ABSTRACT

A digital filter is used to provide a distinctive output signal whenever the frequency of an input signal deviates more than a predetermined amount from a nominal value. The input signals are applied to a digital counter through a coincidence gate which is enabled for precisely timed measurement intervals by means of timing pulses derived from a clock source. Signals are taken from those counter stages having a combined binary value equal to the lowest acceptable frequency and applied to a first NAND gate. Signals are also taken from the counter stage having a binary value equal to one count greater than the highest acceptable frequency and applied to a second NAND gate. The output of the first NAND gate is applied to the D terminal of a D-type flip-flop. The output of the second NAND gate is inverted and applied to the P terminal of the same flip-flop. A sampling pulse is derived from the clock source at the termination of each measurement interval and applied to the CP terminal of the flip-flop. An alarm is connected to the $\bar{Q}$ terminal of the flip-flop. The first NAND gate provides a high level output signal until the counter reaches a count equal to the lowest acceptable frequency. If a sampling pulse occurs before the count reaches this value, the flip-flop is switched and the alarm is actuated. Alternatively, if the second NAND gate is actuated before the sampling pulse occurs, the flip-flop is likewise switched so as to actuate the alarm.

8 Claims, 1 Drawing Figure

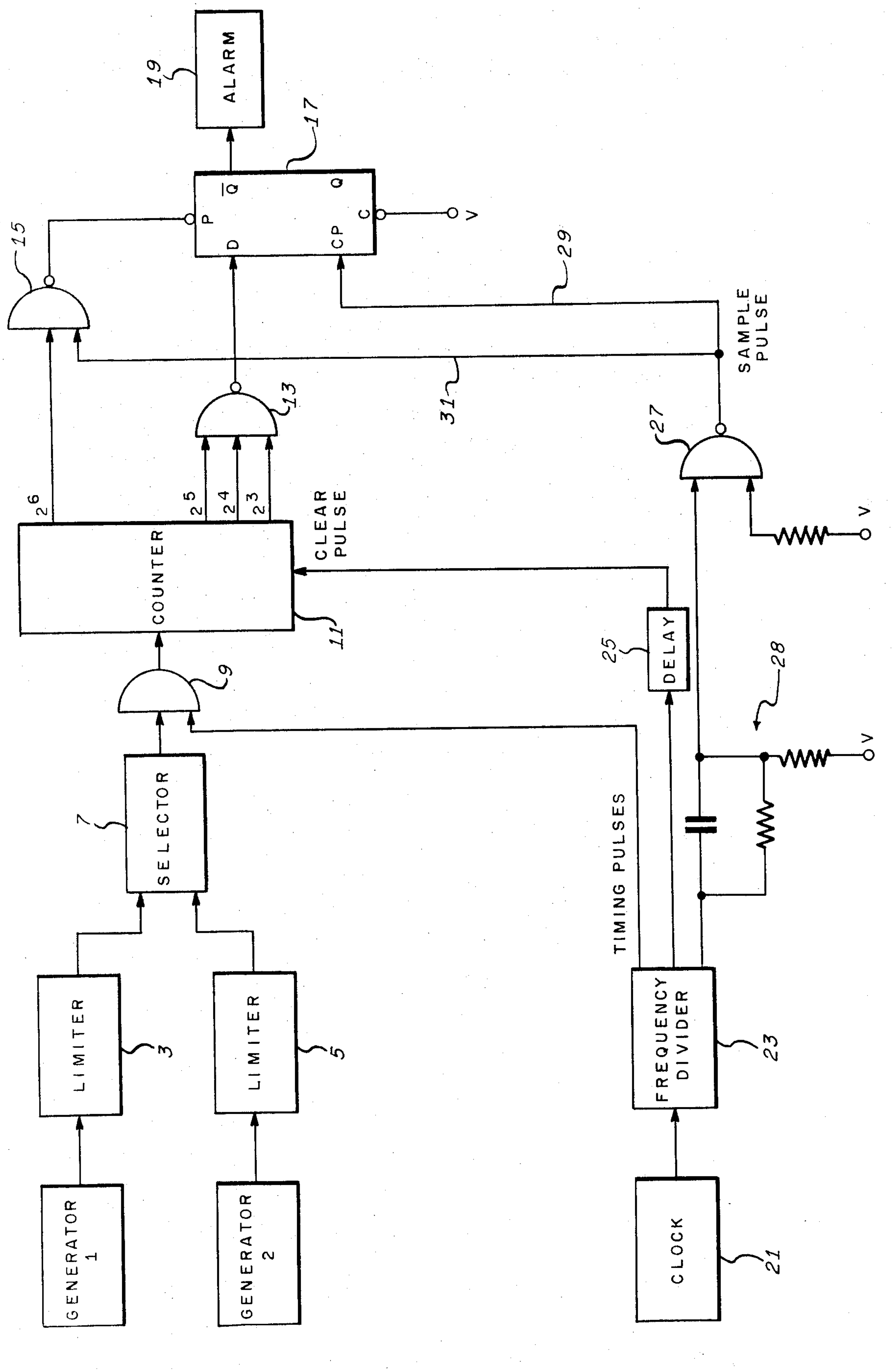
ALARM
19
17
Q̄
Q
P
D
CP
C
V
15
29
SAMPLE PULSE
31
13
27
$2^6$
$2^5$
$2^4$
$2^3$
CLEAR PULSE
COUNTER
11
V
25
DELAY
9
28
V
SELECTOR
7
TIMING PULSES
LIMITER
3
LIMITER
5
FREQUENCY DIVIDER
23
GENERATOR 1
GENERATOR 2
CLOCK
21

DIGITAL FILTER

BACKGROUND OF THE INVENTION

1. Field of the Invention

The invention pertains to frequency measuring devices and more specifically to digital passband filters capable of indicating excessive frequency deviations.

2. Description of the Prior Art

Frequency selective filters are fundamental devices, well known in the electrical arts. Such filters usually employ reactive components whose impedance varies with the frequency of the applied signals. The reactive components in such filters are selected and combined to provide the desired transfer characteristics. In order to obtain sharp cutoff characteristics, such prior art filters frequently require elaborate combinations of reactive and non-reactive components. The present invention eliminates the need for such reactive devices.

SUMMARY OF THE INVENTION

The circuit of the present invention operates by converting the signal to be measured into suitably shaped pulses, counting the number of pulses occurring during a precisely timed measurement interval, providing a first error signal if the number of counted pulses is less than a predetermined minimum, and a second error signal if the number of counted pulses is more than a predetermined maximum, and further providing indicating means responsive to either of said error signals.

BRIEF DESCRIPTION OF THE DRAWING

The sole FIGURE is a block diagram illustrating a circuit employing the principles of the invention.

DESCRIPTION OF THE PREFERRED EMBODIMENT

The accompanying drawing illustrates a specific filter employing the principles of the invention. In the illustrated filter, provisions are made for testing the output of either one of two generators. Each generator produces an output signal in the form of a sine wave and operates at a nominal frequency of 60 hertz. The filter circuit provides an alarm if the frequency of the signal from the selected generator falls below 56 hertz or above 63 hertz.

The signals from the generators 1 and 2 are applied to limiters 3 and 5, respectively. The limiters convert the output signals from the generators to logic level signals suitable for use in the filter circuit. It will be appreciated that the limiter circuits are not essential to the practice of the invention and may be eliminated in the event that the signals to be measured have a wave shape and amplitude suitable for processing in the filter circuit.

The shaped signals from the limiter circuits are applied to a selector 7. The selector may be any switching circuit suitable for switching signals from the selected limiter to the following components in the filter circuit. Filter circuits have been constructed, for instance, in which the selector circuit has employed NAND-NOR logic in conjunction with a flip-flop circuit. The selector in this particular device was actuated in response to first or second start signals developed when the corresponding generator was put into operation.

The output of the selector 7 is applied to a coincidence gate 9 and then to a ripple counter 11. The ripple counter is a conventional binary counter connected to respond to pulses from the coincidence gate 9. Output signals are taken from the counter stages in accordance with the desired passband of the filter. Thus, for the particular filter illustrated in the drawing, individual signals were taken from the $2^3$, $2^4$ and $2^5$ stages. It will be appreciated that each of these stages will have been switched to the binary ONE state after the counter responds to the 56th pulse. Furthermore, each of these stages will remain in the binary ONE state until the counter responds to the 64th pulse.

Signals from the aforementioned counter stages are all applied to a first NAND gate 13.

An output signal is also taken from the counter stage representing the value $2^6$ and applied to a second NAND gate 15. The $2^6$ stage of the counter is switched into the binary ONE state in response to the 64th pulse received by the counter. Furthermore, this stage remains in the binary ONE state until the reception of the 128th pulse by the counter. The output of the first NAND gate 13 is applied to the D terminal of an output flip-flop 17. The output of the second NAND gate 15 is inverted and applied to the P input terminal of the output flip-flop 17.

The output flip-flop 17 is a conventional D-type flip-flop. Such flip-flops, when connected as shown in the figure, will switch to the $\overline{Q}$ state in response to high level signals simultaneously applied to the D and CP terminals. Furthermore, such a flip-flop will unconditionally be switched to the $\overline{Q}$ state in response to a high level signal applied to its P terminal.

The $\overline{Q}$ output terminal of the flip-flop 17 is applied to a suitable utilization circuit illustrated as an alarm 19 in the accompanying figure.

Operation of the filter is controlled by a suitable clock source 21. Ordinarily, measurement intervals of precisely one second duration are desired. However, suitable clock sources ordinarily operate at a higher frequency. Therefore, the output of the clock 21 is passed through a suitable frequency divider 23 so as to obtain a square wave train of one second timing pulses.

The timing pulses from the frequency divider are applied to the coincidence gate 9 so as to enable this gate for precise one second measurement intervals. Thus, the counter 11 is automatically switched to a binary state representative of the number of pulses produced by the selected generator during a one second interval.

A clear signal is also derived from the frequency divider 23 and applied to the counter 11 during the interval between successive timing pulses. The clear signal is depicted as being derived from a delay means 25. However, it will be appreciated that any straightforward means for timing such a clear signal may be employed. Devices have been constructed, for instance, in which logic circuits have been utilized to provide a clear signal in response to the reception of a specified number of clock pulses after the termination of a timing pulse.

A sampling pulse is also derived from the frequency divider 23. This sampling pulse ordinarily occurs at the termination of a timing pulse and before the occurrence of a clear pulse. As illustrated, for instance, the termination of the timing pulse may be detected by means of an inverting gate 27 coupled to the frequency divider through a pulse sharpening circuit 28. The resulting sampling pulse is applied to the output flip-flop 17 through a line 29 and to the second NAND gate 15 through a line 31. The signal applied to the NAND gate 15 through the line 31 serves to enable the NAND gate only during the sampling intervals. Since binary counters are inherently noisy, such an enabling system serves to isolate the output flip-flop 17 from spurious transients produced in the counter during the measurement interval.

At the initiation of a measurement interval, the counter will have been cleared by a previous clear pulse. Thus, each stage in the counter will be in the binary ZERO state. Under these conditions, all inputs to the first and second NAND gates 13 and 15 will be at a low level.

Assume now that the selected generator is providing a 60 hertz output signal. The binary counter 11 will receive exactly 60 pulses during the measurement interval. After the 56th pulse is received, each of the counter stages coupled to the NAND gate 13 will be in the binary ONE state. These stages will remain in the binary ONE state when the 60th pulse is received and the measurement interval terminates. Under these conditions, a low level signal will be applied to the flip-flop from the gate 13 and the sampling pulse will not affect the flip-flop. Furthermore, the $2^6$ counter stage coupled to the NAND gate 15 will remain in the binary ZERO state. Thus, the signal from the gate 15 will not affect the flip-flop and the alarm will not be actuated.

However, assume that the selected generator is producing an output signal having a frequency less than the minimum of 56 cycles per second. Under these conditions, one or more of the counter stages coupled to the NAND gate 13 will remain in the binary ZERO state at the end of a measurement interval and a high level signal will be applied to the flip-flop 17 from the gate 13. When the sampling pulse occurs, the flip-flop 17 will be switched so as to produce an output signal at the $\overline{Q}$ output terminal and the alarm 19 will be actuated.

Similarly, if the selected generator produces a signal having a frequency greater than the upper limit of 64 hertz, the $2^6$ counter stage will be in the binary ONE state at the termination of a measurement interval so as to provide a high level input signal to the second NAND gate 15. When the sampling pulse enables the gate 15, a high level signal will be applied to the flip-flop 17 so as to switch the flip-flop and produce a high level signal at the $\overline{Q}$ terminal and thus actuate the alarm 19.

In actual tests, a filter circuit provided intermittent alarms when the signal from the selected generator fell between 55 hertz and 56 hertz or between 63 hertz and 64 hertz. This caused by the fact that the phase of the generator signal varied randomly with respect to the clock repetition rate. If the frequency of the selected generator fell below 55 hertz or above 64 hertz, however, the circuit provided a constant alarm.

Although the circuit has been illustrated in an environment in which either one of two generators may be monitored, it will be appreciated that the circuit has utility in situations wherein only one generator or any number of generators may be selectively monitored. Furthermore, although an alarm circuit has been depicted, other utilization devices may be employed if desired. The circuit may be used, for instance, in situations employing a primary and a redundant generator. If the signal from the primary generator deviates beyond the tolerable limits, the output flip-flop may be used to actuate a switching means which automatically connects the redundant generator across the line.

It will be appreciated that although the foregoing description concerns a specific 60 hertz filter, the same principles may be utilized to provide filters having any suitable passband merely by applying input signals to the NAND gates 13 and 15 from those stages in the counter 11 having binary values corresponding to the desired upper and lower tolerance limits.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. A digital filter for providing an output signal when the frequency of a received cyclical signal exceeds either of specified upper and lower tolerances, comprising clock means for providing a timing pulse of known duration, a binary counter, gating means for coupling received signals to said counter during the occurrence of a timing pulse, first means responsive to the binary state of said counter to provide a first error signal until the counter reaches a specified minimum count, second means responsive to the binary state of said counter to provide a second error signal when the counter reaches a specified maximum count, means to provide an output signal in response to either of said error signals after the termination of a timing pulse, and means to clear said counter in the interval between successive timing pulses.

2. The filter of claim 1 further including timing means for producing said timing pulses, said timing means providing a train of square wave pulses each having a duration of one second.

3. The filter of claim 2 wherein said means to clear said counter includes means in said timing means to produce a clear pulse in the interval between successive timing pulses.

4. The filter of claim 3 wherein said timing means further includes means to produce a sampling pulse at the termination of a timing pulse.

5. The filter of claim 4 wherein the means to produce said first and second error signals includes first and second NAND gates respectively, each of said gates being connected to receive signals from appropriate counter stages and wherein the means to provide an output signal includes a D-type flip-flop connected to receive error signals from each of said NAND gates as well as a sampling pulse from said timing means, said flip-flop being connected to remain in a first binary state until switched by an error signal, said flip-flop further being connected to produce an output signal when in said second binary state.

6. The filter of claim 5 wherein said second NAND gate is enabled by a sampling pulse.

7. The filter of claim 6 wherein the flip-flop contains P, D, CP and $\overline{Q}$ terminals, said first NAND gate being connected to said D terminal, said second NAND gate being coupled to said P terminal, said timing means being connected to provide sampling pulses to said $\overline{CP}$ terminal, said output signal being taken from said $\overline{Q}$ terminal, whereby said flip-flop is switched to the $\overline{Q}$ binary state in response to the simultaneous occurrence of a sampling pulse and an error signal.

8. The filter of claim 7 wherein the received signals are sine waves having a nominal frequency of 60 hertz, said filter further including limiting means for converting said sine waves into suitable logic level pulses, and wherein said counter includes at least seven stages, said first NAND gate being connected to receive signals from the stages representing $2^3$, $2^4$ and $2^5$ counts, said second NAND gate being connected to receive signals from the stage representing $2^6$ counts.

* * * * *